UNITED STATES PATENT OFFICE 2,435,392

AMINO ARSENICALS AND PROCESS FOR PREPARING SAME

Cliff Struthers Hamilton, Lincoln, Nebr., assignor to Parke, Davis & Company, Detroit, Mich., a corporation of Michigan No Drawing. Application June 19, 1943, Serial No. 491,563

15 Claims. (Cl. 260—271)

The invention relates to new amino arsenicals. More particularly, the invention concerns new pyridylaminobenzene arsenicals wherein an arsenical group is directly attached to the benzene nucleus. Many of these new compounds are useful as chemotherapeutic and trypanocidal agents and as intermediates for the same.

The new compounds have the following general formula

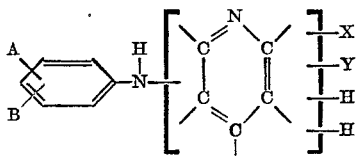

where the group

is attached to the pyridine nucleus at one of the 2 and 4 positions and where A and B, and also X and Y, are attached to any of the available carbon atoms of the benzene and pyridine ring systems respectively. B represents a member of the class hydrogen, hydroxyl, hydroxyalkoxyl and middle halogens (chlorine and bromine). X and Y are members of the class hydrogen, nitro (—NO$_2$), amino and its acid addition salt groups —NH$_2$.HA' where A' is the anion of an acid having a dissociation constant of about $10^{-3.5}$ or more, such as hydrochloric or hydrobromic acid, sulfuric acid, phosphoric acid, tartaric acid, etc.

A is an arsenical grouping of the class, —AsO$_3$H$_2$, —AsO$_3$HM, —AsO$_3$M$_2$, —AsO, —As(OH)$_2$, —As(Hal)$_2$, —AsS and —As(SR)$_2$ where M is a basic salt-forming group such as alkali metal, ammonium or substituted ammonium, where Hal represents a halogen of the class chlorine, bromine and iodine, where R represents an alkyl radical directly attached by a methylene linkage to the sulfur atom of —SR and containing or not the group —CONH—, said radical being substituted by one of —COOH and —COOM and substituted or not by one or more of —NH$_2$ and —NH$_2$.HA' whenever R contains —COOH, but substituted or not by one or more of —NH$_2$ only when R contains —COOM, M and A' being as already defined.

Although the group —NH— can be attached to the pyridine nucleus at either the 2 or 4 position, I prefer to attach the group at the 2 position, because of the ease of carrying out the reaction.

The compounds may be prepared by either of two methods. In the first method a chloro- or bromopyridine, which may or may not be further substituted, is reacted with a substituted or unsubstituted aminobenzenearsonic acid under acid conditions as described in the pending application of Clarence Kenneth Banks, Serial No. 464,250, filed November 2, 1942.

The reaction may be illustrated graphically as follows:

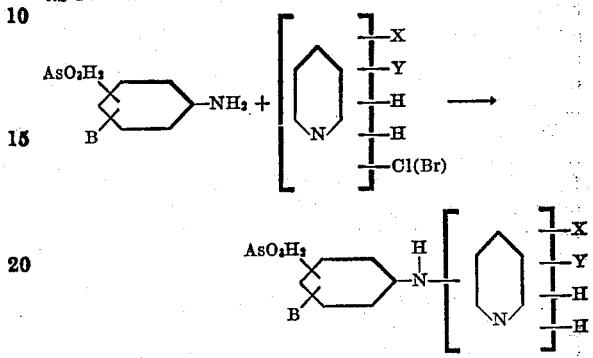

where B, X and Y are as previously defined and where the element chlorine (or bromine) is attached to the pyridine nucleus at the two or four position. It is quite important that the hydrogen ion concentration be controlled so as to maintain a definite acidity, otherwise the yields are markedly reduced and in some cases none of the desired product is formed.

The second method consists of reacting the same type of pyridine compound as reacted in the first method and of the structure

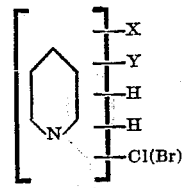

where X and Y are as previously defined and the chlorine (or bromine) is in the 2 or 4 position and the hydrogens occupy the remaining open positions at ring carbon atoms, with a substituted aniline of the structure,

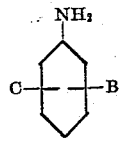

where B represents groups previously described and C is an amino group, nitro group, acylamino group or other group which may be converted by hydrolysis or reduction to an amino group, the group C being in the meta or para position to the amino group of the above formula. The compound obtained has the formula

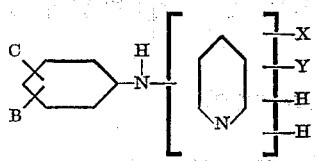

and is then hydrolyzed or reduced, if necessary, to convert C to an amino group and this product is diazotized and coupled with sodium arsenite according to the general methods of the Bart reaction, or similar known method for substituting an arsonic acid grouping for a primary amino group. If the group C of the reactant

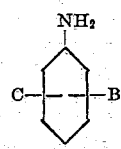

is ortho to the —NH₂ group, the later diazotization reaction forms a stable intermediate that cannot be coupled with sodium arsenite. For this reason, preparation of final products wherein the grouping —NH— is attached to the benzene ring at a position ortho to the arsenical grouping are not ordinarily attempted by this second procedure involving diazotization.

In both of the above mentioned methods, the arsono group of the product obtained may be further modified to give other members of the class A by application of various chemical procedures, such as those illustrated further herein.

*Example 1*

2-chloro-5-nitropyridine (5 g.) and p-arsanilic acid (5.6 g.) are refluxed in 40 ml. of 0.875 N hydrochloric acid and 240 ml. of water for about 40 hours. The white solid which steam distills up into the condenser is repeatedly scraped back into the reaction flask. After the condensate no longer appears in the condenser, the refluxing is continued for another 10 hours. The solution is cooled and the crystallized solid filtered off, extracted with 100 ml. of hot water and recrystallized from acetic acid. The product is a yellow, crystalline substance, not melting at 250° C. The yield is 55% of the theoretical amount. The product analyzes for 22.08% arsenic; theory requires 22.09%. The product is

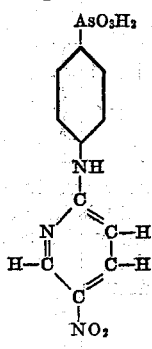

2-(4'-arsonoanilino)-5-nitropyridine

By the application of this demonstrated procedure, many therapeutically valuable compounds or intermediates for such compounds can be made. The following compounds are examples of compounds whose preparation by the same or similar procedure will be apparent to those skilled in the art.

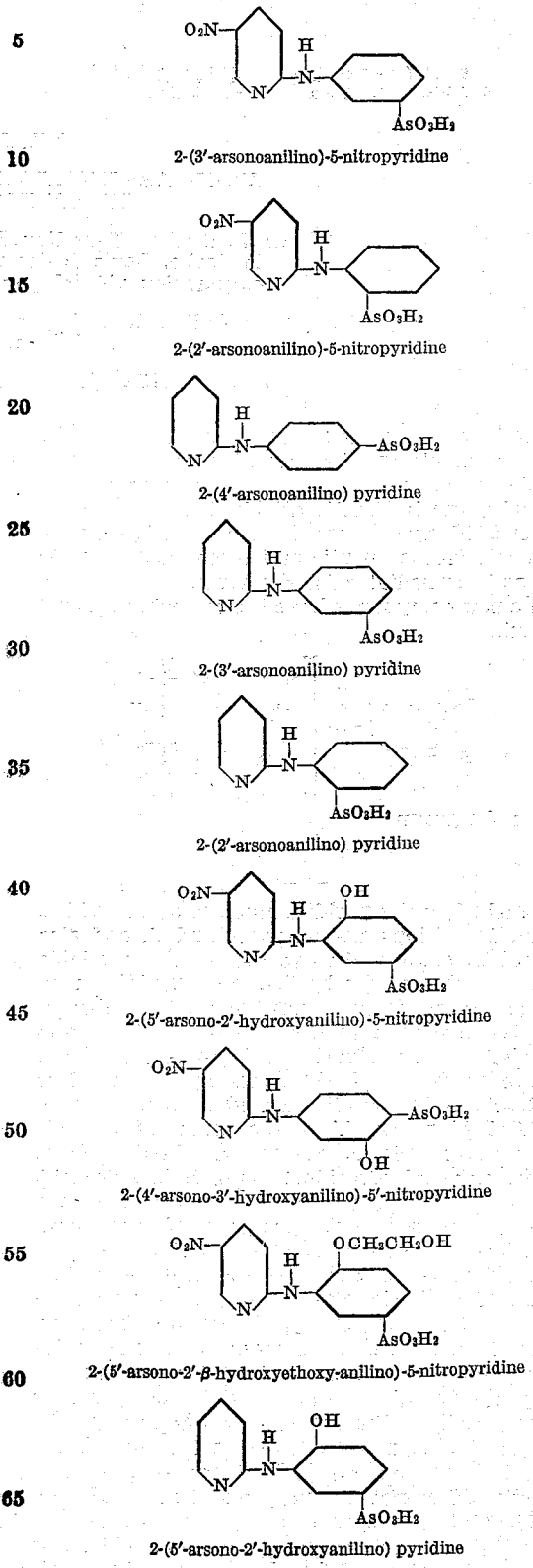

2-(3'-arsonoanilino)-5-nitropyridine 2-(2'-arsonoanilino)-5-nitropyridine 2-(4'-arsonoanilino) pyridine 2-(3'-arsonoanilino) pyridine 2-(2'-arsonoanilino) pyridine 2-(5'-arsono-2'-hydroxyanilino)-5-nitropyridine 2-(4'-arsono-3'-hydroxyanilino)-5'-nitropyridine 2-(5'-arsono-2'-β-hydroxyethoxy-anilino)-5-nitropyridine 2-(5'-arsono-2'-hydroxyanilino) pyridine

*Example 2* m-Phenylenediamine (21.6 g.), anhydrous sodium acetate (16.4 g.) and 2-chloro-5-nitropyridine (15.8 g.) are refluxed in 500 ml. of 95% ethyl alcohol for five hours. After charcoaling, diluting with water and cooling, 2-(3'-aminoanilino)-5-nitropyridine separates as a dark yellow product, M. P. 178° C. This compound is dissolved in hot water (500 ml.), hydrochloric acid (40 ml.) added and, after cooling, is diazotized with sodium nitrite at 5–10° C. The diazonium solution is coupled with a solution of sodium arsenite (1.5 equivalents) at 0° C. and after warming slowly is filtered, the filtrate made acid to litmus paper, charcoaled and again filtered. The resulting solution is acidified to Congo red paper.

The product is

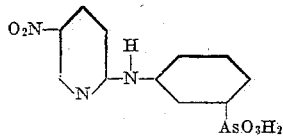

2-(3'-arsonoanilino)-5-nitropyridine

If p-phenylene diamine and 2-chloro-5-nitropyridine are used, the product

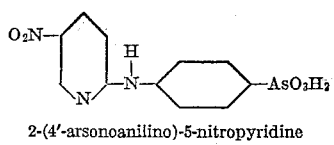

2-(4'-arsonoanilino)-5-nitropyridine and if p-phenylenediamine and 4-chloro-3-nitropyridine are used, the product is

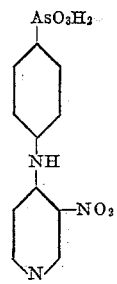

4-(4'-arsonoanilino)-3-nitropyridine

Example 3

2-(4'-arsonoanilino)-5-nitropyridine (4 g.) is dissolved in water with sodium hydroxide to give a neutral to slightly basic solution and reduced at room temperature using Raney nickel catalyst and molecular hydrogen at 40 pounds pressure. After removing the catalyst, the product is isolated by acidifying the solution with dilute hydrochloric acid. It is a white, crystalline product, turning lavender when exposed to air. On heating it melts with decomposition at about 240° C. Arsenic analysis shows 24.00%, while the theory requires 24.23%. It is

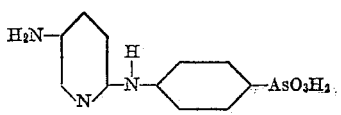

2-(4'-arsonoanilino)-5-aminopyridine

Not only can the catalytic methods of reduction be used, but other common reducing agents such as ferrous hydroxide and reduced iron, as are known to one skilled in the art, give the same product. It is also obvious that other nitro substituted compounds, for example those which may be obtained by the methods demonstrated in Examples 1 and 2, will yield the corresponding amino substituted derivatives upon reduction.

Example 4

2-(4'-arsonoanilino)-5-aminopyridine (21 g.) is dissolved in 800 ml. of 5% hydrochloric acid, one gram of potassium iodide added and sulfur dioxide gas passed through the solution until reaction ceases. The excess sulfur dioxide is boiled out and sufficient ammonia added to give a neutral reaction to litmus paper. The product precipitates as a nearly white powder, sintering at 122° C. and decomposing at 132° C. Arsenic analysis shows 25.15%, the theory requires 25.35%. The product is

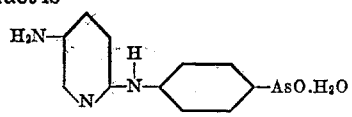

2-(4'-arsinosoanilino)-5-aminopyridine monohydrate

By using any of the arsonic acids made available, by exercising the techniques described in Examples 1, 2 and 3, in place of 2-(4'-arsonoanilino)-5-aminopyridine, the corresponding arsine oxides may be prepared.

Example 5

One-tenth mole of 5-amino-2-(4'-arsinosoanilino) pyridine is suspended in water and 0.2 mole of thioglycollic acid and 0.2 mole of sodium hydroxide added. A clear solution is formed, which is filtered and carefully acidified. The product is filtered off and washed repeatedly to remove any unreacted materials. It is

5-amino-2-[4'-di-(carboxymethylenethio) arsinosoanilino] pyridine

This product may be dissolved in dilute sodium hydroxide and the crystalline sodium salt thrown out by the addition of alcohol and ether. It has the formula

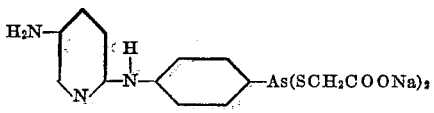

5-amino-2-[4'-di-(sodium carboxymethylenethio)-arsinosoanilino] pyridine

Other sulfhydryl compounds, such as cysteine and glutathione, may be substituted for thioglycollic acid. Other pyridine amino phenylarsine oxides may also be converted to their thio derivatives.

The arsono compounds of the invention are of especial value since they not only embody compounds valuable as therapeutic agents, but include compounds which may serve as intermediates for compounds of therapeutic value. For example, arsono compounds of the formula

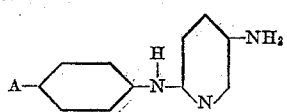

and their HA' acid addition salts, where A represents one of the pentavalent arsenic groups AsO₃H₂, —AsO₃HM or —AsO₃M₂, can easily be reduced in the presence of middle halogen acids to give the corresponding trivalent arsenical compounds and their hydrohalides where A is one of —AsCl₂, —AsBr₂ and (by simple neutralization) —AsO and —As(OH)₂. In this way there are obtained the valuable arsenicals of the formula

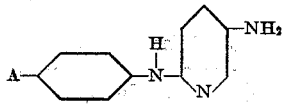

and their HA' acid addition salts, where A is a member of the class —AsCl₂, —AsBr₂, —AsO and —As(OH)₂, the group A' being the anion of an acid having a dissociation constant of at least about $10^{-3.5}$ and being —Cl whenever A is —AsCl₂ and —Br whenever A is —AsBr₂.

What I claim as my invention is:

1. A compound of the formula

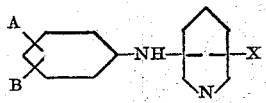

where the NH group is attached to the pyridine nucleus at one of the positions 2 and 4, B is a member of the class consisting of —H, —OH, —O-alkylene-OH, —Cl and —Br, X is a member of the class consisting of —H, —NO₂, —NH₂ and —NH₂.HA', A' being the anion of an acid having a dissociation constant of at least $10^{-3.5}$, A is an arsenical grouping of the class consisting of —AsO₃H₂, —AsO₃HM, —AsO₃M₂, —AsO, —As(OH)₂, —As(SCH₂COOH)₂ and —As(SCH₂COOM)₂ and M is a basic salt-forming group.

2. A compound of the formula

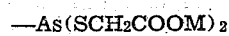

where X is a member of the class consisting of —H, —NO₂, —NH₂ and —NH₂.HA', A' being the anion of an acid having a dissociation constant of at least $10^{-3.5}$, A is an arsenical grouping of the class consisting of —AsO₃H₂, —AsO₃HM, —AsO₃M₂, —AsO, —As(OH)₂, As(SCH₂COOH)₂ and —As(SCH₂COOM)₂, and M is a basic salt-forming group.

3. A compound of the formula

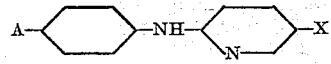

and its HA' acid addition salts, where A' is the anion of an acid having a dissociation constant of at least $10^{-3.5}$, A is an arsenical grouping of the class consisting of —AsO₃H₂, —AsO₃HM, —AsO₃M₂, —AsO, —As(OH)₂, —As(SCH₂COOH)₂ and —As(SCH₂COOM)₂, and M is a basic salt-forming group.

4. A compound of the formula

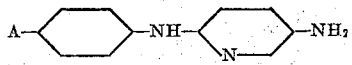

and its HA' acid addition salts, where A' is the anion of an acid having a dissociation constant of at least $10^{-3.5}$, and M is a member of the class consisting of hydrogen and a basic salt-forming group.

5. A compound of the formula

where M is a member of the class consisting of hydrogen and a basic salt-forming group.

6. A compound of the formula

and its HA' acid addition salts, where A' is the anion of an acid having a dissociation constant of at least $10^{-3.5}$.

7. A compound of the formula

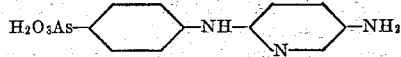

8. A compound of the formula

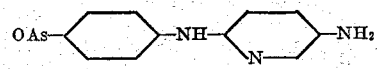

and its HA' acid addition salts, where A' is the anion of an acid having a dissociation constant of at least $10^{-3.5}$.

9. A compound of the formula

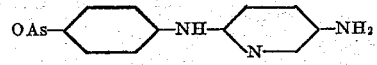

10. A compound of the formula

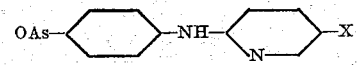

where X is a member of the class consisting of —H, —NO₂, —NH₂ and —NH₂.HA', and A' is the anion of an acid having a dissociation constant of at least $10^{-3.5}$.

11. Process for the preparation of pyridylaminobenzene arsenicals which comprises reacting in acidic aqueous medium, a pyridine compound of the formula

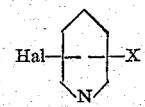

with an aminobenzene arsonic acid of formula

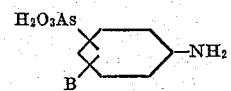

where B is a member of the class consisting of —H, —OH, —O-alkylene-OH, —Cl and —Br, Hal is a member of the class consisting of —Cl and —Br attached to one of the positions 2 and 4 of the pyridine nucleus of said pyridine compound and X is a member of the class consisting of —H and —NO₂.

12. Process for the preparation of pyridylaminobenzene arsenicals which comprises reacting in acidic aqueous medium, a pyridine compound of the formula

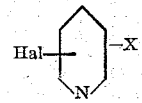

with an aminobenzene arsonic acid of formula

where Hal is a member of the class consisting of —Cl and —Br attached to one of the positions 2 and 4 of the pyridine nucleus of said pyridine compound, and X is a member of the class consisting of —H and —NO₂.

13. Process for the preparation of pyridylaminobenzene arsenicals which comprises reacting in acidic aqueous medium, a pyridine compound of the formula

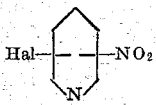

with an aminobenzene arsonic acid of formula

where Hal is a member of the class consisting of —Cl and —Br attached to one of the positions 2 and 4 of the pyridine nucleus of said pyridine compound.

14. Process for the preparation of pyridylaminobenzene arsenicals which comprises reacting in acidic aqueous medium, a pyridine compound of the formula

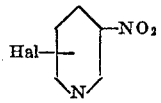

with an aminobenzene arsonic acid of formula

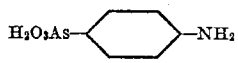

where Hal is a member of the class consisting of —Cl and —Br attached to one of the positions 2 and 4 of the pyridine nucleus of said pyridine compound.

15. Process for the preparation of pyridylaminobenzene arsenicals which comprises reacting in acidic aqueous medium, a pyridine compound of the formula

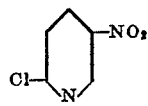

with an aminobenzene arsonic acid of formula

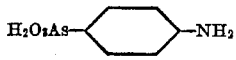

CLIFF STRUTHERS HAMILTON.

REFERENCES CITED

The following references are of record in the file of this patent:

UNITED STATES PATENTS

| Number | Name | Date |
| --- | --- | --- |
| 2,334,321 | Freidheim | Nov. 16, 1943 |